United States Patent
Utsunomiya

(10) Patent No.: US 11,715,250 B2
(45) Date of Patent: Aug. 1, 2023

(54) IMAGE PROCESSING APPARATUS, METHOD FOR CONTROLLING IMAGE PROCESSING APPARATUS, AND STORAGE MEDIUM

(71) Applicant: Seiko Epson Corporation, Tokyo (JP)

(72) Inventor: Kohei Utsunomiya, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 171 days.

(21) Appl. No.: 17/385,550

(22) Filed: Jul. 26, 2021

(65) Prior Publication Data
US 2022/0032650 A1 Feb. 3, 2022

(30) Foreign Application Priority Data
Jul. 29, 2020 (JP) ................................ 2020-127999

(51) Int. Cl.
| | | |
|---|---|---|
| G06T 15/00 | (2011.01) | |
| G06T 19/00 | (2011.01) | |
| B41J 3/407 | (2006.01) | |
| B41J 2/045 | (2006.01) | |

(52) U.S. Cl.
CPC ........... *G06T 15/00* (2013.01); *B41J 2/04586* (2013.01); *B41J 3/4073* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 2010/0091308 A1 | 4/2010 | Ono | |
| 2016/0225193 A1* | 8/2016 | Guo | ................... G05B 19/4099 |
| 2018/0126731 A1* | 5/2018 | Ishikawa | .............. B41J 2/14274 |
| 2019/0210363 A1* | 7/2019 | Ohara | .................... B41J 2/2132 |
| 2020/0272867 A1* | 8/2020 | Kaiba | ................... B41J 11/008 |

FOREIGN PATENT DOCUMENTS

| | | |
|---|---|---|
| JP | 2010-093617 | 4/2010 |
| JP | 2015-012357 | 1/2015 |
| JP | 2016-046793 | 4/2016 |

* cited by examiner

*Primary Examiner* — Saptarshi Mazumder
(74) *Attorney, Agent, or Firm* — Workman Nydegger

(57) ABSTRACT

Disclosed is an image processing apparatus for supplying display information indicating a three-dimensional image to a recording device including a discharge section that discharges liquid to an object having a three-dimensional shape to form a three-dimensional image on the object. The image processing apparatus includes an obtaining section that obtains virtual space information and a generating section that generates the display information based on the virtual space information. The virtual space information indicates a virtual image in which the three-dimensional image is represented in a three-dimensional virtual space, and a virtual discharge section, in which the discharge section is represented in the virtual space. The relative positional relationship in the virtual space between the virtual image and the virtual discharge section indicated by the virtual space information corresponds to the relative relationship between the three-dimensional image and the discharge section.

10 Claims, 9 Drawing Sheets

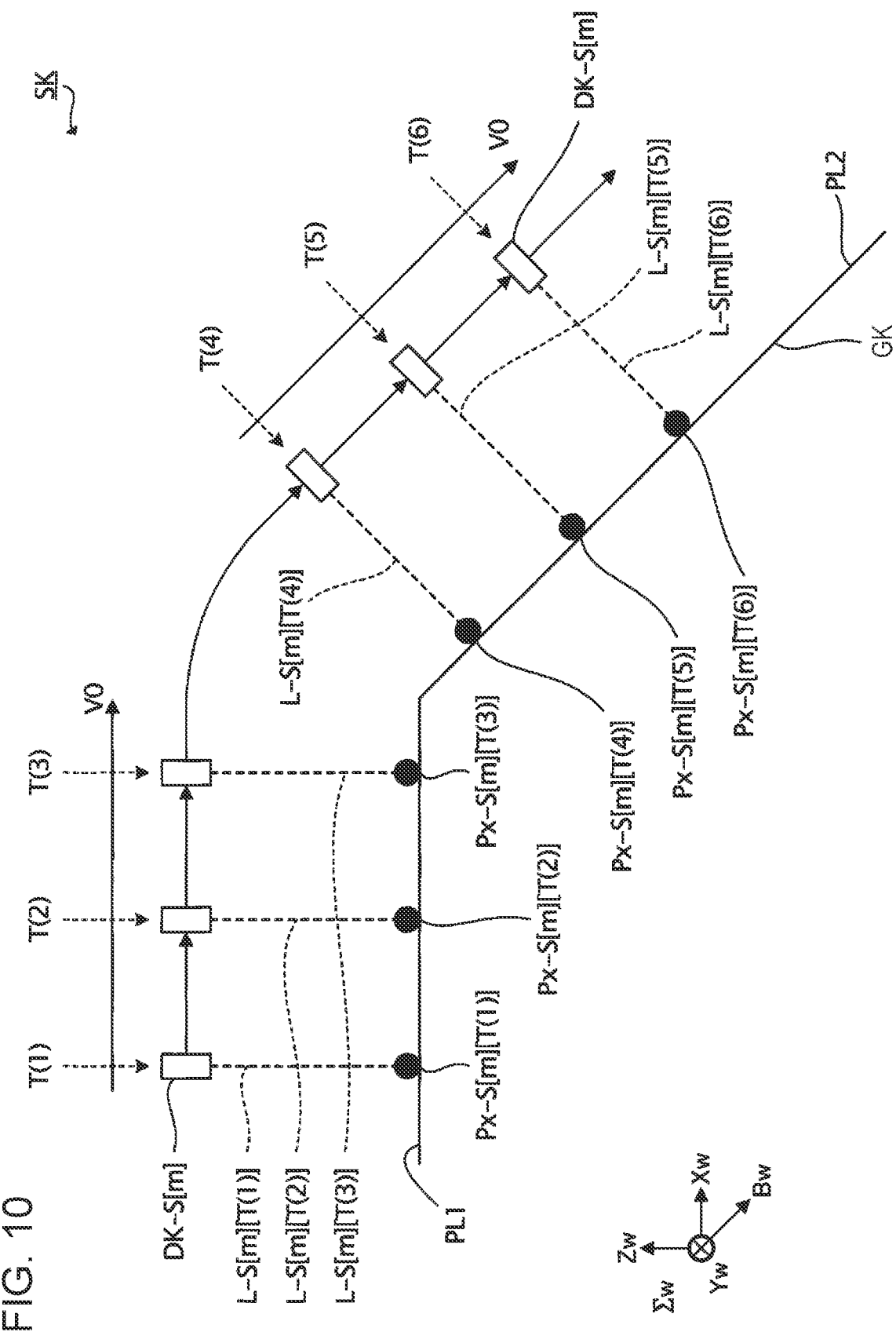

IMAGE PROCESSING APPARATUS, METHOD FOR CONTROLLING IMAGE PROCESSING APPARATUS, AND STORAGE MEDIUM

The present application is based on, and claims priority from JP Application Serial Number 2020-127999, filed Jul. 29, 2020, the disclosure of which is hereby incorporated by reference herein in its entirety.

BACKGROUND

1. Technical Field

The present disclosure relates to an image processing apparatus, a method for controlling an image processing apparatus, and a storage medium.

2. Related Art

As described in JP-A-2016-046793, JP-A-2015-012357, and JP-A-2010-093617, techniques are known for supplying, to a recording device that discharges liquid such as ink onto a two-dimensional printing medium, two-dimensional image data indicating a two-dimensional image to be formed on the printing medium by the recording device.

However, such techniques have a problem in that it is very difficult to form an image having a shape other than a two-dimensional plane shape.

SUMMARY

An image processing apparatus according to an aspect of the present disclosure is an image processing apparatus for supplying display information indicating a three-dimensional image to a recording device including a discharge section that discharges liquid to an object having a three-dimensional shape to form a three-dimensional image on the object. The image processing apparatus includes an obtaining section that obtains virtual space information, and a generating section that generates the display information based on the virtual space information. The virtual space information indicates a virtual image in which the three-dimensional image is represented in a three-dimensional virtual space, and a virtual discharge section in which the discharge section is represented in the virtual space. The relative positional relationship in the virtual space between the virtual image and the virtual discharge section indicated by the virtual space information corresponds to the relative positional relationship between the three-dimensional image and the discharge section.

A method for controlling an image processing apparatus according to another aspect of the present disclosure is a method for supplying display information indicating a three-dimensional image to a recording device including a discharge section that discharges liquid to an object having a three-dimensional shape to form a three-dimensional image on the object. The method includes an obtaining step of obtaining virtual space information and a generating step of generating the display information based on the virtual space information. The virtual space information indicates a virtual image in which the three-dimensional image is represented in a three-dimensional virtual space, and a virtual discharge section in which the discharge section is represented in the virtual space. The relative positional relationship in the virtual space between the virtual image and the virtual discharge section indicated by the virtual space information corresponds to the relative positional relationship between the three-dimensional image and the discharge section.

A non-transitory computer-readable storage medium according to a still another aspect of the present disclosure is a non-transitory computer-readable storage medium storing a program of an image processing apparatus for supplying display information indicating a three-dimensional image to a recording device including a discharge section that discharges liquid to an object having a three-dimensional shape to form a three-dimensional image on the object. The program causes a computer to function as an obtaining section that obtains virtual space information, and a generating section that generates the display information based on the virtual space information. The virtual space information indicates a virtual image in which the three-dimensional image is represented in a three-dimensional virtual space, and a virtual discharge section in which the discharge section is represented in the virtual space. The relative positional relationship in the virtual space between the virtual image and the virtual discharge section indicated by the virtual space information corresponds to the relative positional relationship between the three-dimensional image and the discharge section.

BRIEF DESCRIPTION OF THE DRAWINGS

FIG. 10 is an illustrative diagram illustrating an example of virtual space information according to a fifth modification.

DESCRIPTION OF EXEMPLARY EMBODIMENTS

Embodiments of the present disclosure will be described below with reference to the accompanying drawings. However, in the figures, components are not drawn to scale such that their dimensions may differ from the actual dimensions as appropriate. Embodiments described below are suitable specific examples of the present disclosure, and therefore various technically desirable limitations are imposed on the embodiments. However, the scope of the present disclosure is not limited to the embodiments unless any part of the description given below limits the present disclosure.

A. Embodiment

A recording system Sys according to the present embodiment will be described.

In the present embodiment, the recording system Sys is a system for forming an image G on a surface SF of an object Obj having a three-dimensional shape. The recording system Sys may form the image G for the object Obj having a two-dimensional shape.

1. Overview of Recording System Sys

First, with reference to FIGS. 1 to 4, an exemplary outline of a configuration of the recording system Sys according to the present embodiment is described below.

Figure 1:
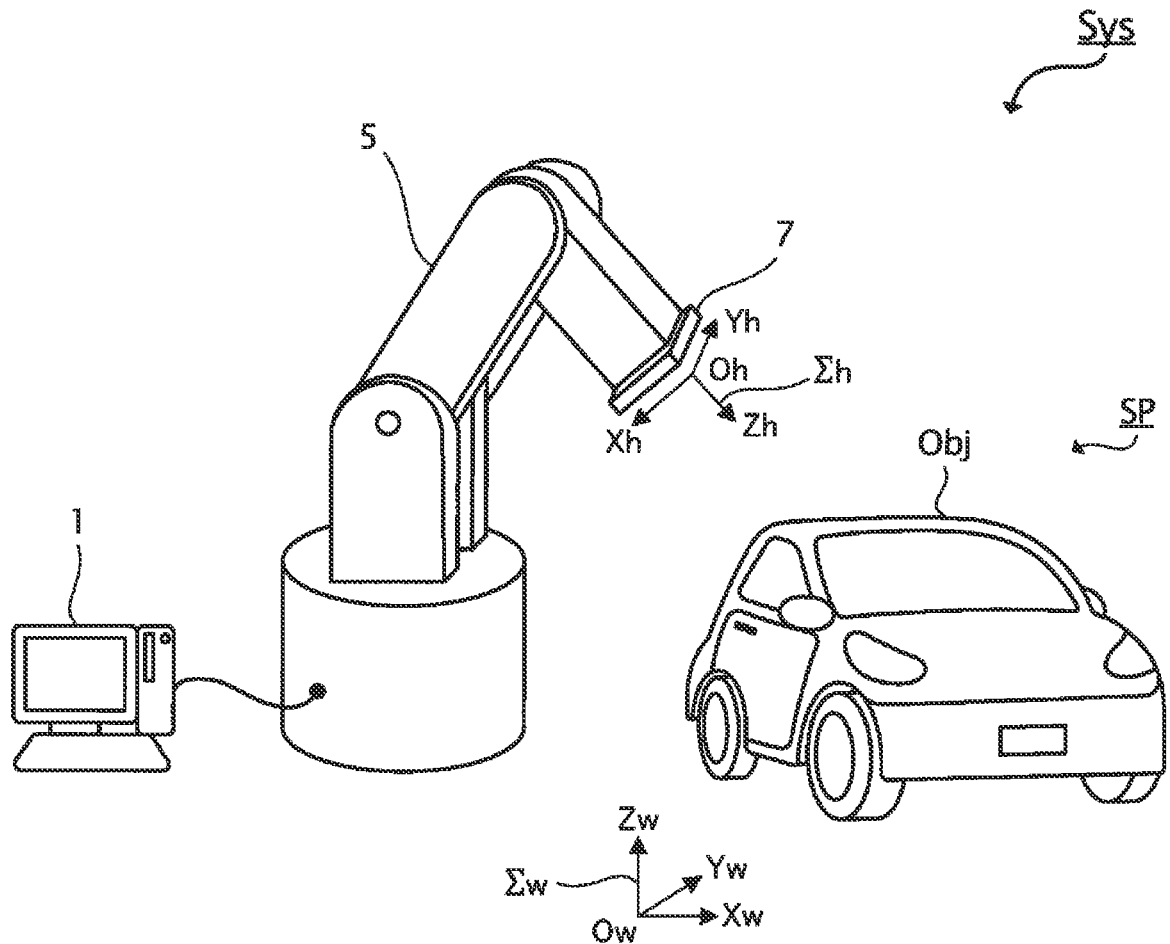
FIG. 1 is a pictorial representation depicting an example of a recording system according to an embodiment of the present disclosure.

FIG. 1 is a pictorial representation depicting an example of an overview of the recording system Sys.

As depicted in FIG. 1, the recording system Sys includes a terminal device 1 and a recording device 5.

The terminal device 1 generates display information Img indicating the image G to be formed on the surface SF of the object Obj by the recording system Sys.

By using the display information Img generated by the terminal device 1, the recording device 5 forms the image G indicated by the display information Img on the surface SF of the object Obj. As will be described in more detail later, the recording device 5 includes a head unit 7 that discharges ink for forming the image G.

In the present embodiment, as depicted in FIG. 1, the terminal device 1 sets a coordinate system $\Sigma w$ in a three-dimensional real space SP in which the object Obj is located. The coordinate system $\Sigma w$ as used herein, which is a three-axis coordinate system having an Xw axis, a Yw axis, and a Zw axis perpendicular to each other, is a coordinate system fixed at a certain location in the real space SP. Hereinafter, the origin of the coordinate system $\Sigma w$ is referred to as an origin Ow. Hereinafter, one direction along the Xw axis is referred to as a +Xw direction and the direction opposite to the +Xw direction is referred to as a −Xw direction, one direction along the Yw axis is referred to as a +Yw direction and the direction opposite to the +Yw direction is referred to as a −Yw direction, and one direction along the Zw axis is referred to as a +Zw direction and the direction opposite to the +Zw direction is referred to as a −Zw direction. Additionally, hereinafter, the +Xw direction and the −Xw direction may be collectively referred to as an Xw-axis direction, the +Yw direction and the −Yw direction may be collectively referred to as a Yw-axis direction, and the +Zw direction and the −Zw direction may be collectively referred to as a Zw-axis direction. In the present embodiment, assume that the Xw axis, the Yw axis, and the Zw axis are perpendicular to each other. However, the present disclosure is not limited to such. The Xw axis, the Yw axis, and the Zw axis may intersect each other.

In the present embodiment, as depicted in FIG. 1, the terminal device 1 sets a coordinate system $\Sigma h$ in the real space SP. The coordinate system $\Sigma h$ as used herein, which is a three-axis coordinate system having an Xh axis, a Yh axis, and a Zh axis perpendicular to each other, is a coordinate system fixed to the head unit 7. Hereinafter, the origin of the coordinate system $\Sigma h$ is referred to as an origin Oh. Hereinafter, one direction along the Xh axis is referred to as a +Xh direction and the direction opposite to the +Xh direction is referred to as a −Xh direction, one direction along the Yh axis is referred to as a +Yh direction and the direction opposite to the +Yh direction is referred to as a −Yh direction, and one direction along the Zh axis is referred to as a +Zh direction and the direction opposite to the +Zh direction is referred to as a −Zh direction. Additionally, hereinafter, the +Xh direction and the −Xh direction may be collectively referred to as an Xh-axis direction, the +Yh direction and the −Yh direction may be collectively referred to as a Yh-axis directions, and the +Zh direction and the −Zh direction may be collectively referred to as a Zh-axis direction. In the present embodiment, assume that the Xh axis, the Yh axis, and the Zh axis are perpendicular to each other. However, the present disclosure is not limited to such. The Xh axis, the Yh axis, and the Zh axis may intersect each other.

Figure 2:
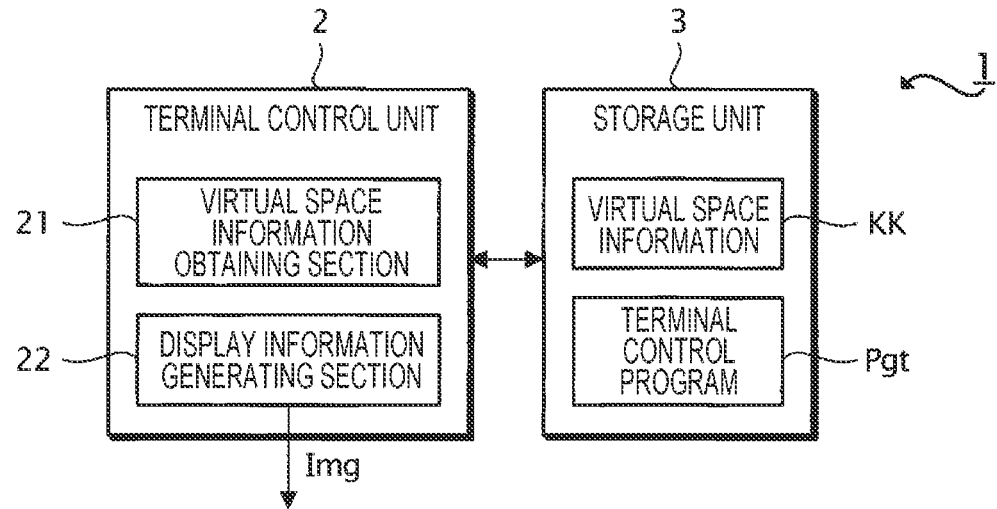
FIG. 2 is a functional block diagram illustrating an example of a configuration of a terminal device.

FIG. 2 is a functional block diagram illustrating an example of a configuration of the terminal device 1.

As illustrated in FIG. 2, the terminal device 1 includes a terminal control unit 2 and a storage unit 3.

The storage unit 3 stores virtual space information KK and a control program Pgt of the terminal device 1.

The virtual space information KK is information indicating a virtual space SK in which the real space SP is virtually represented. As will be described in more detail later, in the present embodiment, a virtual image GK, in which the image G in the real space SP is virtually represented in the virtual space SK, and a virtual head unit HK, in which the head unit 7 in the real space SP is virtually represented in the virtual space SK, are provided in the virtual space SK indicated by the virtual space information KK.

The terminal control unit 2 includes one or more CPUs and controls components of the terminal device 1. The CPU, as used herein, is the abbreviation for Central Processing Unit. The one or more CPUs provided in the terminal control unit 2 are able to function as a virtual space information obtaining section 21 and a display information generating section 22 by executing the control program Pgt stored in the storage unit 3 and thus operating according to the control program Pgt.

The virtual space information obtaining section 21 obtains the virtual space information KK stored in the storage unit 3. In the present embodiment, assume, for example, that the virtual space information KK is stored in the storage unit 3. However, the present disclosure is not limited to such. For example, the virtual space information KK may be stored in an external device located outside the terminal device 1. In this case, the virtual space information obtaining section 21 may obtain the virtual space information KK from the external device.

The display information generating section 22 generates the display information Img based on the virtual space information KK. A process of generating the display information Img based on the virtual space information KK is referred to as a display information generation process hereinafter.

Figure 3:
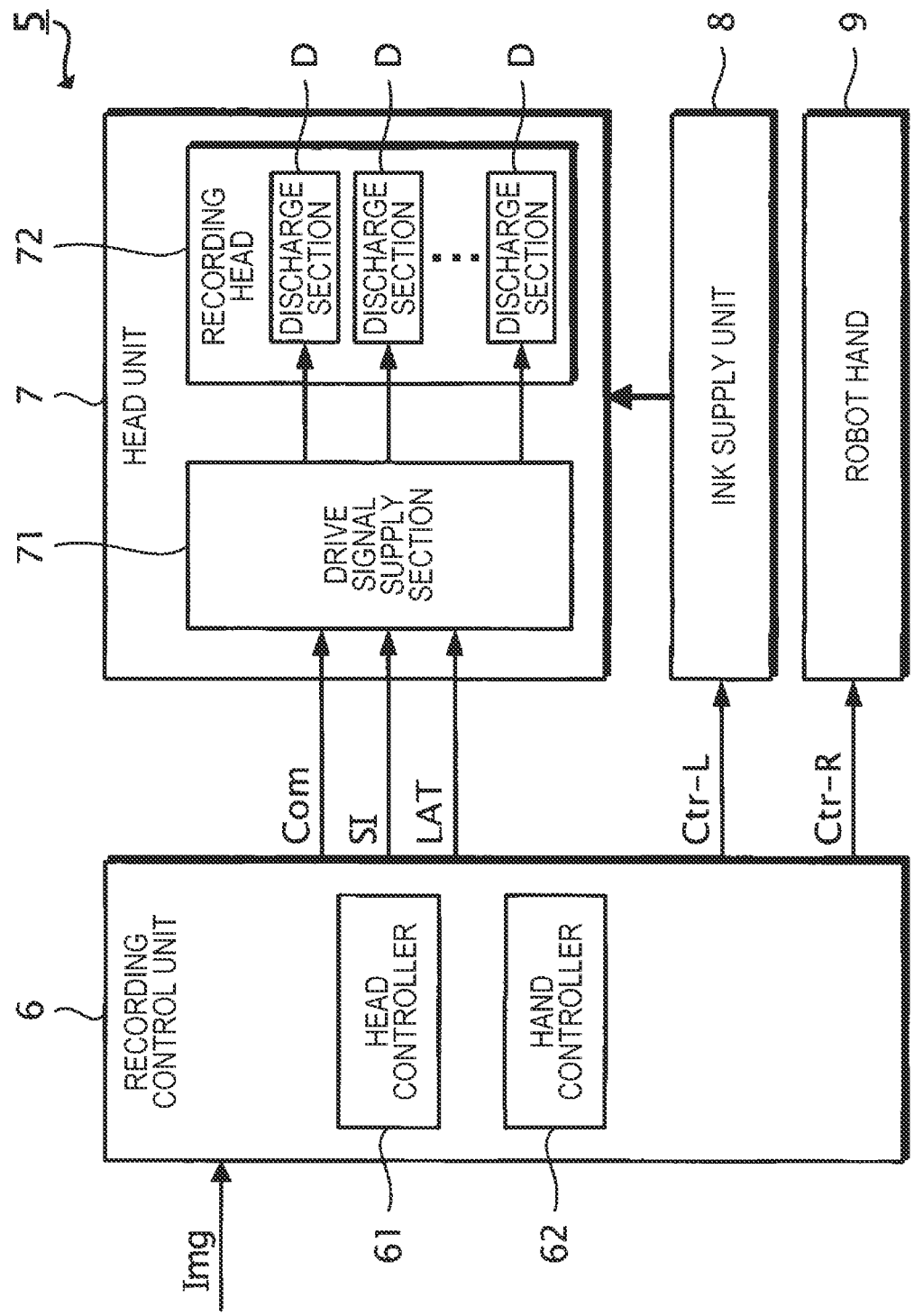
FIG. 3 is a functional block diagram illustrating an example of a configuration of a recording device.

FIG. 3 is a functional block diagram illustrating an example of a configuration of the recording device 5.

As illustrated in FIG. 3, the recording device 5 includes a recording control unit 6, a head unit 7, an ink supply unit 8, and a robot hand 9.

The recording control unit 6 includes a processing circuit, such as a CPU or an FPGA, and a storage circuit, such as a semiconductor memory, and controls components of the recording device 5. The FPGA, as used herein, is the abbreviation for Field Programmable Gate Array. The processing circuit included in the recording control unit 6 may function as a head controller 61 and a hand controller 62.

The head controller 61 generates a drive control signal SI for controlling the drive of the head unit 7 in accordance with the image information Img. The head controller 61 also generates a drive signal Com for driving the head unit 7, a latch signal LAT that defines a timing for driving the head unit 7, and a control signal Ctr-L for controlling the ink supply unit 8.

In accordance with the display information Img, the hand controller 62 generates a control signal Ctr-R for controlling the position and orientation of the robot hand 9 in the real space SP.

The head unit 7 includes a drive signal supply section 71 and a recording head 72.

The recording head 72 includes a plurality of discharge sections D. Each discharge section D discharges ink filled inside the discharge section D by being driven by the drive signal Com such that dots are formed on the surface SF of the object Obj.

The drive signal supply section 71 switches, in accordance with the drive control signal SI, between supplying and not supplying the drive signal Com to each of the plurality of discharge sections D.

In the present embodiment, assume, for example, that the head unit 7 is attached to the top of the robot hand 9.

The robot hand 9 changes the position and orientation of the top of the robot hand 9 in the real space SP in accordance with the control signal Ctr-R. Thus, the robot hand 9 changes the position and orientation of the head unit 7, which is attached to the top of the robot hand 9, in the real space SP so that the position and orientation of the head unit 7 are suitable for formation of the image G on the surface SF of the object Obj.

The ink supply unit 8 supplies ink stored inside the ink supply unit 8 to the head unit 7 in accordance with the control signal Ctr-L. In the present embodiment, assume that ink of four colors, cyan, magenta, yellow, and black, is stored inside the ink supply unit 8.

In the present embodiment, assume, for example, that the plurality of discharge sections D in the head unit 7 include a plurality of discharge sections D-Cy that discharge ink of cyan, a plurality of discharge sections D-Mg that discharge ink of magenta, a plurality of discharge sections D-Yl that discharge ink of yellow, and a plurality of discharge sections D-Bk that discharge ink of black. More specifically, in the present embodiment, assume, for example, that M discharge sections D-Cy, M discharge sections D-Mg, M discharge sections D-Yl, and M discharge sections D-Bk are provided in the head unit 7, where the value M is a natural number that satisfies M≥1.

Hereinafter, the mth discharge section D-Cy among the M discharge sections D-Cy is referred to as a discharge section D-Cy[m], the mth discharge section D-Mg among the M discharge sections D-Mg is referred to as a discharge section D-Mg[m], the mth discharge section D-Y1 among the M discharge sections D-Y1 is referred to as a discharge section D-Y1[m], and the mth discharge section D-Bk among the M discharge sections D-Bk is referred to as a discharge section D-Bk[m], where the variable m is a natural number that satisfies 1≤m≤M. The discharge section D-Cy[m], the discharge section D-Mg[m], the discharge section D-Yl[m], and the discharge section D-Bk[m] may be collectively referred to as a discharge section D-S[m] hereinafter. The discharge section D-S[m] discharges ink filled inside the discharge section D-S[m] from a nozzle N provided in the discharge section D-S[m].

As described above, when the display information Img is supplied, the recording control unit 6 controls discharge of ink from the plurality of discharge sections D in the head unit 7 by using the drive control signal SI generated in accordance with the display information Img. The recording control unit 6 also controls the position and orientation in the real space SP of the head unit 7 attached to the top of the robot hand 9 by using the control signal Ctr-R generated in accordance with the display information Img. This enables the recording device 5 to form the image G in accordance with the display information Img on the surface SF of the object Obj in the real space SP. A process in which the recording device 5 forms the image G in accordance with the display information Img on the surface SF of the object Obj may be referred to as a printing process hereinafter.

Figure 4:
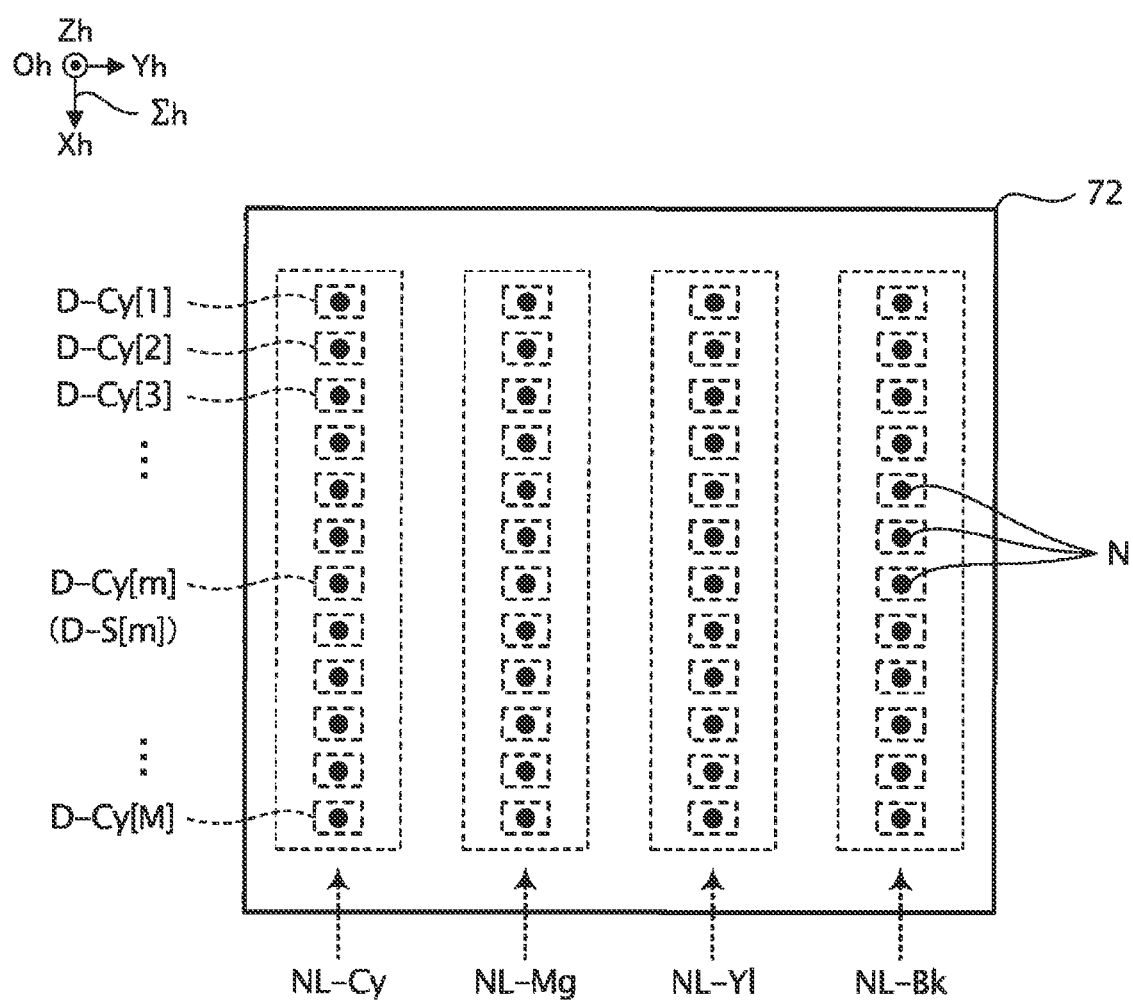
FIG. 4 is a plan view illustrating an example of a configuration of a recording head.

FIG. 4 is an illustrative diagram illustrating an example of arrangement of (4×M) nozzles N corresponding to (4×M) discharge sections D in the recording head 72, when the recording head 72 is viewed in plane from the −Zh side. As illustrated in FIG. 4, a plurality of nozzle lines NL including a nozzle line NL-Cy, a nozzle line NL-Mg, a nozzle line NL-Yl, and a nozzle line NL-Bk are provided in the recording head 72. The nozzle line NL as used herein is a plurality of nozzles N extending linearly in a certain direction. In the present embodiment, assume, for example, that each nozzle line NL consists of M nozzles N arranged in a manner extending in the Xh-axis direction.

Among the nozzle lines, the nozzle line NL-Cy is a nozzle line NL consisting of M nozzles N corresponding to the M discharge sections D-Cy, the nozzle line NL-Mg is a nozzle line NL consisting of M nozzles N corresponding to the M discharge sections D-Mg, the nozzle line NL-Yl is a nozzle line NL consisting of M nozzles N corresponding to the M discharge sections D-Yl, and the nozzle line NL-Bk is a nozzle line NL consisting of M nozzles N corresponding to the M discharge sections D-Bk.

2. Virtual Space Information

Figure 5:
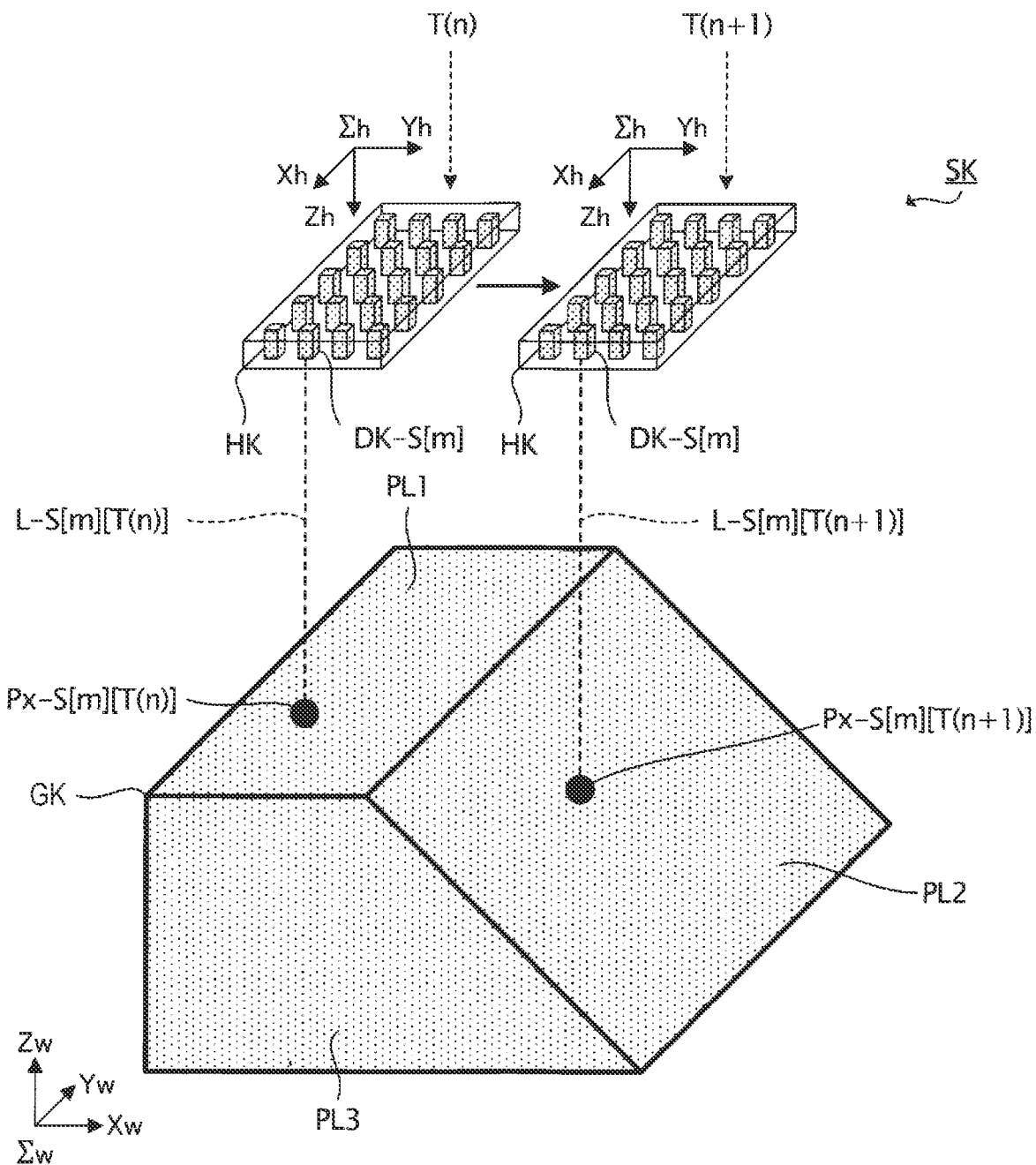
FIG. 5 is an illustrative diagram depicting an example of virtual space information.

The following describes the virtual space information KK with reference to FIG. 5.

FIG. 5 is an illustrative diagram depicting an example of the virtual space information KK.

As illustrated in FIG. 5, the virtual space information KK is information indicating the virtual space SK, in which the virtual image GK and the virtual head unit HK are arranged, as described above. In the present embodiment, assume that, in the virtual space SK, the coordinate system $\Sigma w$ fixed at a certain position in the virtual space SK and the coordinate system $\Sigma h$ fixed to the virtual head unit HK are provided.

As described above, the virtual image GK is an image that virtually represents, in the virtual space SK, the image G to be formed in the real space SP. Specifically, the virtual image GK is a virtual image in which the position, shape, size, and coloring of the image G in the real space SP are represented in the virtual space SK. More specifically, the virtual image GK is arranged in the virtual space SK such that the coordinates of each portion of the image GK in the coordinate system $\Sigma w$ in the virtual space SK are approximately equal to the coordinates of each portion of the image G in the coordinate system $\Sigma w$ in the real space SP. The expression "approximately equal" as used herein includes, in addition to being completely equal, being regarded as being equal when it is assumed that there is no error. The virtual image GK is arranged in the virtual space SK such that the coloring of each portion of the virtual image GK is approximately equal to the coloring of each portion of the image G.

The virtual image GK may be an image represented as bit map data or may be an image represented as vector type data.

As described above, the virtual head unit HK is a virtual object in which the head unit 7 in the real space SP is represented in the virtual space SK. Specifically, the virtual head unit HK is a virtual object in which the position and orientation of the head unit 7 in the real space SP are represented in the virtual space SK. More specifically, the virtual head unit HK is arranged in the virtual space SK such that the position and orientation of the virtual head unit HK in the coordinate system Σw arranged in the virtual space SK are approximately equal to the position and orientation of the head unit 7 in the coordinate system Σw arranged in the real space SP.

In the present embodiment, the virtual head unit HK includes (4×M) virtual discharge sections DK-S[m] corresponding one-to-one to the (4×M) discharge sections D-S[m] included in the head unit 7.

The virtual discharge section DK-S[m] as used herein is a virtual object in which the position and orientation of the discharge section D-S[m] in the real space SP are represented in the virtual space SK. Specifically, the virtual discharge section DK-S[m] is arranged in the virtual space SK such that the ink discharge direction from the discharge section D-S[m] in the coordinate system Σw arranged in the real space SP is approximately equal to the virtual ink discharge direction from the virtual discharge section DK-S[m] in the coordinate system Σw arranged in the virtual space SK. A virtual straight line intersecting the virtual discharge section DK-S[m] in the virtual space SK and extending in the virtual ink discharge direction from the virtual discharge section DK-S[m] is referred to hereinafter as a virtual line L-S[m]. That is, in the present embodiment, the virtual discharge section DK-S[m] is arranged in the virtual space SK such that the ink discharge direction from the discharge section D-S[m] in the coordinate system Σw arranged in the real space SP is approximately equal to the extending direction of the virtual line L-S[m] in the coordinate system Σw arranged in the virtual space SK. The virtual discharge section DK-S[m] is also arranged in the virtual space SK such that the coordinates of the virtual discharge section DK-S[m] in the coordinate system Σw arranged in the virtual space SK are approximately equal to the coordinates of the discharge section D-S[m] in the coordinate system Σw arranged in the real space SP.

In this way, in the present embodiment, the relative positional relationship between the virtual image GK and the virtual discharge section DK-S[m] in the virtual space SK corresponds to the relative positional relationship between the image G and the discharge section D-S[m] in the real space SP.

In the present embodiment, assume that the head unit 7 performs the printing process by discharging ink from some or all of the (4×M) discharge sections D-S[m] at each of N points of time T(n), from time T(1) to time T(N), while changing in the position in the real space SP during a period of time from time T(1) to time T(N). Here, the value N is a natural number of two or more. The variable n is a natural number that satisfies 1≤n≤N. In the present embodiment, time T(n+1) is assumed to be the point of time when a predetermined period of time ΔT has elapsed after time T(n).

In addition, in the present embodiment, the virtual head unit HK in the virtual space SK indicated by the virtual space information KK changes in the position and orientation in the virtual space SK so as to correspond to a change in the position and orientation of the head unit 7 in the real space SP. Specifically, at each of N points of time T(n), from time T(1) to time T(N), when the head unit 7 performs the printing process, the position and orientation of the virtual head unit HK in the virtual space SK correspond to the position and orientation of the head unit 7 in the real space SP. That is, at each of the N points of time T(n), from time T(1) to time T(N), when the head unit 7 performs the printing process, the position and orientation of the virtual discharge section DK-S[m] in the virtual space SK correspond to the position and orientation of the discharge section D-S[m] in the real space SP.

A virtual line L-S[m] in accordance with the virtual discharge section DK-S[m] at time T(n) is referred to hereinafter as a virtual line L-S[m][T(n)]. Additionally, the point of intersection of the virtual line L-S[m][T(n)] and the virtual image GK is referred to hereinafter as an intersection point Px-S[m][T(n)].

FIG. 5 illustrates that the virtual image GK includes a partial image GK1 drawn on a plane PL1, a partial image GK2 drawn on a plane PL2, and a partial image GK3 drawn on a plane PL3. FIG. 5 also illustrates that the virtual head unit HK moves in the +Yh direction from time T(n) to time T(n+1). FIG. 5 also illustrates that the intersection point Px-S[m][T(n)] is located on the plane PL1 and an intersection point Px-S[m][T(n+1)] is located on the plane PL2.

In the present embodiment, the virtual space information KK includes virtual image color information CK indicating the color of the virtual image GK. The virtual image color information CK is information representing the color of the virtual image GK by using red, green, and blue colors. Specifically, the virtual image color information CK includes read virtual image information CK-R indicating a red virtual image GK-R, which is a red component image of the virtual image GK, green virtual image information CK-G indicating a green component image GK-G, which is a green component image of the virtual image GK, and blue virtual image information CK-B indicating a blue virtual image GK-B, which is a blue component image of the virtual image GK.

Among these items of virtual image information, the red virtual image information CK-R indicates a grayscale value WK-R that is the grayscale value of the red component of the color of each portion of the virtual image GK. The green virtual image information CK-G indicates a grayscale value WK-G that is the grayscale value of the green component of the color of each portion of the virtual image GK. The blue virtual image information CK-B indicates a grayscale value WK-B that is the grayscale value of the blue component of the color of each portion of the virtual image GK. In the present embodiment, assume, for example, that the grayscale value WK-R is any of 256 values, from 0 to 255, the grayscale value WK-G is any of 256 values, from 0 to 255, and the grayscale value WK-B is any of 256 values, from 0 to 255.

Hereinafter, the grayscale value WK-R of the red component of the color of the intersection point Px-S[m][T(n)] of the virtual image GK is referred to as a grayscale value WK-R-S[m][T(n)], the grayscale value WK-G of the green component of the color of the intersection point Px-S[m][T(n)] of the virtual image GK is referred to as a grayscale value WK-G-S[m][T(n)], and the grayscale value WK-B of the blue component of the color of the intersection point Px-S[m][T(n)] of the virtual image GK is referred to as a grayscale value WK-B-S[m][T(n)]. Additionally, of the virtual image color information CK, information indicating the color of the intersection point Px-S[m][T(n)] is referred to hereinafter as virtual intersection point color information CKP-S[m][T(n)]. That is, the virtual intersection point color information CKP-S[m][T(n)] is information indicating the grayscale value WK-R-S[m][T(n)], the grayscale value WK-G-S[m][T(n)], and the grayscale value WK-B-S[m][T(n)].

3. Operations of Recording System

Figure 6:
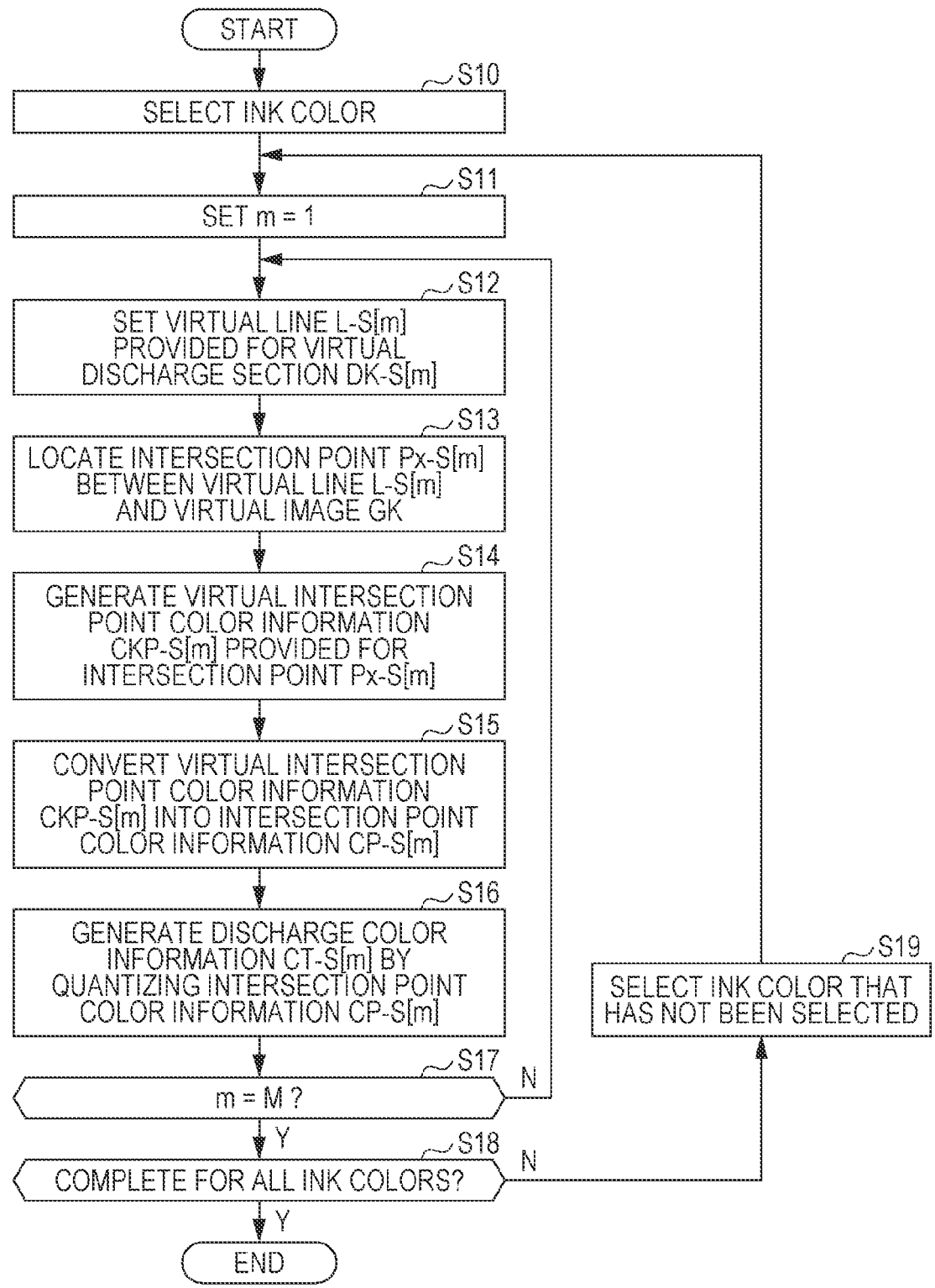
FIG. 6 is a flowchart illustrating an example of a display information generation process.

The following describes an example of operations of the recording system Sys according to the present embodiment with reference to FIG. 6.

FIG. 6 is a flowchart illustrating an example of operations of the recording system Sys when the recording system Sys performs the display information generation process. As described above, the display information generation process is a process of generating the display information Img based on the virtual space information KK. In the present embodiment, assume that the display information generation process is performed N times corresponding to the N points of time T(n) included in the period of time from time T(1) to time T(N) when the printing process is performed. FIG. 6 illustrates the display information generation process performed corresponding to time T(n).

As illustrated in FIG. 6, in response to start of the display information generation process, first, the display information generating section 22 selects one of the colors of ink capable of being discharged by the recording device 5, that is, cyan, magenta, yellow, and black (S10). The color of ink selected in step S10 or step S19 described later may be referred to hereinafter as a selected color.

Next, the display information generating section 22 sets the variable m to one (S11).

Next, the display information generating section 22 sets the virtual line L-S[m][T(n)] provided for the virtual discharge section DK-S[m] related to the selected color in the virtual space SK indicated by the virtual space information KK (S12).

Then, the display information generating section 22 locates the position of the intersection point Px-S[m][T(n)] of the virtual line L-S[m][T(n)] set in step S12 and the virtual image GK, in the virtual space SK indicated by the virtual space information KK (S13). Here, the position of the intersection point Px-S[m][T(n)] may be, for example, the coordinates of the intersection point Px-S[m][T(n)] in the coordinate system Σw in the virtual space SK.

Next, the display information generating section 22 determines the virtual intersection point color information CKP-S[m][T(n)], which is provided for the position of the intersection point Px-S[m][T(n)] specified in step S13, based on the virtual image color information CK (S14). Information including the virtual intersection point color information CKP-S[m][T(n)] and information on the position of the intersection point Px-S[m][T(n)] is referred to hereinafter as intersection point information JPx-S[m][T(n)].

Next, the display information generating section 22 generates intersection point color information CP-S[m][T(n)] that represents the color of the intersection point Px-S[m][T(n)] of the virtual image GK, which is indicated by the virtual intersection point color information CKP-S[m][T(n)], in cyan, magenta, yellow, and black, which are colors of ink capable of being discharged by the recording device 5 (S15). Specifically, the intersection point color information CP-S[m][T(n)] is information representing a grayscale value WK-Cy-S[m][T(n)] of the cyan component of the color of the intersection point Px-S[m][T(n)] of the virtual image GK, a grayscale value WK-Mg-S[m][T(n)] of the magenta component of the color of the intersection point Px-S[m][T(n)] of the virtual image GK, a grayscale value WK-Yl-S[m][T(n)] of the yellow component of the color of the intersection point Px-S[m][T(n)] of the virtual image GK, and a grayscale value WK-Bk-S[m][T(n)] of the black component of the color of the intersection point Px-S[m][T(n)] of the virtual image GK.

In the present embodiment, assume, for example, that the grayscale value WK-Cy-S[m][T(n)] may be any of 256 values from 0 to 255, the grayscale value WK-Mg-S[m][T(n)] may be any of 256 values from 0 to 255, the grayscale value WK-Yl-S[m][T(n)] may be any of 256 values from 0 to 255, and the grayscale value WK-Bk-S[m][T(n)] may be any of 256 values from 0 to 255.

Thereafter, the display information generating section 22 generates discharge color information CT-S[m][T(n)] in which the grayscale values represented by the intersection point color information CP-S[m][T(n)] is quantized into a grayscale value capable of being represented by the recording device 5 (S16). Here, the discharge color information CT-S[m][T(n)] is information indicating a grayscale value WT-S[m][T(n)], which is a grayscale value corresponding to the color of ink provided for the discharge section D-S[m], among a grayscale value WT-Cy-S[m][T(n)] of the cyan component of the color of a portion corresponding to the intersection point Px-S[m][T(n)] in the image G, a grayscale value WT-Mg-S[m][T(n)] of the magenta component of the color of the portion corresponding to the intersection point Px-S[m][T(n)] in the image G, a grayscale value WT-Yl-S[m][T(n)] of the yellow component of the color of the portion corresponding to the intersection point Px-S[m][T(n)] in the image G, and a grayscale value WT-Bk-S[m][T(n)] of the black component of the color of the portion corresponding to the intersection point Px-S[m][T(n)] in the image G.

In the present embodiment, assume, for example, that the recording device 5 may discharge ink droplets of three kinds of sizes, large dots, medium dots, and small dots, from each discharge section D-S[m]. Therefore, in the present embodiment, assume, for example, that the grayscale value WT-S[m][T(n)] may be any of four values, grayscale value "0" corresponding to the case where the discharge section D-S[m] discharges no ink, grayscale value "1" corresponding to the case where the discharge section D-S[m] discharges ink of an amount equivalent to a small dot, grayscale value "2" corresponding to the case where the discharge section D-S[m] discharges ink of an amount equivalent to a medium dot, and grayscale value "3" corresponding to the case where the discharge section D-S[m] discharges ink of an amount equivalent to a large dot.

Next, the display information generating section 22 determines whether the variable m satisfies m=M (S17).

If the determination result in step S17 is negative, then the display information generating section 22 causes the process to proceed to step S12.

However, if the determination result in step S17 is affirmative, the display information generating section 22 determines whether, in the display information generation process, all the colors of ink capable of being discharged by the recording device 5 have been selected (S18).

If the determination result in step S18 is negative, then the display information generating section 22 selects a color that has not been selected in the display information generation process among the colors of ink capable of being discharged by the recording device 5 (S19) and causes the process to proceed to step S11.

However, if the determination result in step S18 is affirmative, the display information generating section 22 terminates the display information generation process.

As described above, the display information generating section 22 performs the display information generation process at each time T(n) to generate (4×M) pieces of display color information CT-S[m][T(n)] corresponding to the (4×M) discharge sections D-S[m] included in the head unit 7. The display information generating section 22 then outputs, as the display information Img, (N×4×M) pieces of discharge color information CT-S[m][T(n)], which are generated by repeatedly performing the display information generation process at the N times of point T(n) included in the period of time from time T(1) to time T(N) when the printing process is performed.

4. Summarization of Embodiment

As described above, the terminal device 1 according to the present embodiment is the terminal device 1 that supplies the display information Img indicating the image G to the recording device 5 including the discharge section D-S[m] that discharges ink to the three-dimensional shaped object Obj to form the image G on the object Obj. The terminal device 1 includes the virtual space information obtaining section 21 that obtains the virtual space information KK indicating the virtual image GK, in which the image G is represented in the three-dimensional virtual space SK, and the virtual discharge section DK-S[m], in which the discharge section D-S[m] is represented in the virtual space SK, and the display information generating section 22 that generates the display information Img based on the virtual space information KK. The relative positional relationship in the virtual space SK between the virtual image GK and the virtual discharge section DK-S[m] indicated by the virtual space information KK corresponds to the relative positional relationship between the image G and the discharge section D-S[m].

That is, in the present embodiment, the display information generating section 22 generates the display information Img based on the virtual space information KK indicating the virtual space SK that includes the virtual image GK and the virtual discharge section DK-S[m]. Therefore, according to the present embodiment, the terminal device 1 may generate the display information Img that is suited for the recording device 5 to form the image G on the three-dimensional object Obj.

In the present embodiment, the terminal device 1 is an example of an "image processing apparatus", the virtual space information obtaining section 21 is an example of an "obtaining section", the display information generating section 22 is an example of a "generating section", the image G is an example of a "three-dimensional image", and the ink is an example of "liquid".

In the terminal device 1 according to the present embodiment, the display information generating section 22 may generate the intersection point information JPx-S[m] based on the virtual space information KK. The intersection point information JPx-S[m] is about the intersection point Px-S[m] of the virtual line L-S[m], which extends in a virtual ink discharge direction from the virtual discharge section DK-S[m] in the virtual space SK, and the virtual image GK. The display information generating section 22 may generate the display information Img based on the intersection point information JPx-S[m].

Therefore, according to the present embodiment, even when the object Obj on which the image G is to be formed has a three-dimensional shape, the color of dots to be formed by the discharge section D-S[m] corresponding to the virtual discharge section DK-S[m] may be specified in accordance with the intersection point information JPx-S[m].

In the present embodiment, the virtual ink discharge direction is an example of a "specific direction".

In the present embodiment, the recording device 5 may include a plurality of discharge sections D-S[m] for discharging ink of a plurality of kinds corresponding to a plurality of colors, the intersection point information JPx-S[m] may include the virtual intersection point color information CKP-S[m] on the color of the virtual image GK at the intersection point Px-S[m], and the display information generating section 22 may generate the intersection point color information CP-S[m], which represents the color of the virtual image GK at the intersection point Px-S[m] indicated by the intersection point information JPx-S[m] in the plurality of colors corresponding to the plurality of kinds of ink, based on the intersection point information JPx-S[m] and generate the display information Img based on the intersection point color information CP-S[m].

Therefore, according to the present embodiment, even when the object Obj on which the image G is to be formed has a three-dimensional shape, the color of dots to be formed by the discharge section D-S[m] corresponding to the virtual discharge section DK-S[m] may be specified in accordance with the intersection point color information CP-S[m].

That is, in the present embodiment, the recording device may include a plurality of discharge sections for discharging a plurality of kinds of liquid corresponding to a plurality of colors, the intersection point information may include information on the color of the virtual image at the intersection point, and the generating section may generate intersection point color information, which represents the color of the virtual image at the intersection point indicated by the intersection point information in the plurality of colors corresponding to the plurality of kinds of liquid, based on the intersection point information and generate the display information based on the intersection point color information.

Additionally, in the terminal device 1 according to the present embodiment, the display information generating section 22 may generate the discharge color information CT-S[m] by quantizing the grayscale value of the virtual image GK at the intersection point Px-S[m] indicated by the intersection point information JPx-S[m] and generate the display information Img based on the discharge color information CT-S[m].

Therefore, according to the present embodiment, the display information Img having grayscale values capable of being represented by the recording device 5 may be generated.

In the present embodiment, the discharge color information CT-S[m] is an example of "quantization information".

Additionally, in the present embodiment, the recording device 5 may include the head unit 7 provided with the discharge section D-S[m], and the robot hand 9 that changes the relative positional relationship between the head unit 7 and the object Obj.

Therefore, according to the present embodiment, the head unit 7 may be moved to the position and orientation that are suited for the head unit 7 to form the image G on the object Obj.

In the present embodiment, the robot hand 9 is an example of a "moving mechanism".

B. Modifications

The forms illustrated above may be modified in various manners. Specific manners of modifications will be illustrated below. Two or more manners arbitrarily selected from the manners illustrated below may be appropriately combined together as long as they are not inconsistent with each other.

First Modification

In the embodiment described above, after locating the intersection point Px-S[m][T(n)] of the virtual image GK and the virtual line L-S[m], the display information generating section 22 converts the color of the intersection point Px-S[m][T(n)], which is indicated by the virtual intersection point color information CKP-S[m][T(n)] provided for the intersection point Px-S[m][T(n)], into the intersection point color information CP-S[m][T(n)] represented in cyan, magenta, yellow, and black. However, the present disclosure is not limited to such.

For example, first, the display information generating section 22 may generate conversion color information CKH in which the color of the virtual image GK indicated by the virtual image color information CK is represented in cyan, magenta, yellow, and black. Second, the display information generating section 22 may locate the position of the intersection point Px-S[m][T(n)]. Third, the display information generating section 22 may generate the intersection point color information CP-S[m][T(n)] based on the conversion color information CKH. Fourth, the display information generating section 22 may generate the discharge color information CT-S[m][T(n)] based on the intersection point color information CP-S[m][T(n)].

In this way, in the present modification, the recording device 5 includes a plurality of discharge sections D-S[m] for discharging a plurality of kinds of ink corresponding to a plurality of colors, and the display information generating section 22 generates the conversion color information CKH, which represents the color of the virtual image GK in a plurality of colors corresponding to a plurality of kinds of liquid, based on the virtual space information KK and generates the display information Img based on the conversion color information CKH.

Therefore, according to the present modification, even when the object Obj on which the image G is to be formed has a three-dimensional shape, the color of dots to be formed by the discharge section D-S[m] corresponding to the virtual discharge section DK-S[m] may be specified in accordance with the conversion color information CKH.

In the present embodiment, the conversion color information CKH is an example of "image color information".

Second Modification

In the embodiment and the first modification described above, the display information generating section 22 may determine the grayscale value WT-S[m][T(n)] in accordance with a change over time in the distance along the virtual line L-S[m][T(n)] from the virtual discharge section DK-S[m] to the intersection point Px-S[m][T(n)].

Figure 7:
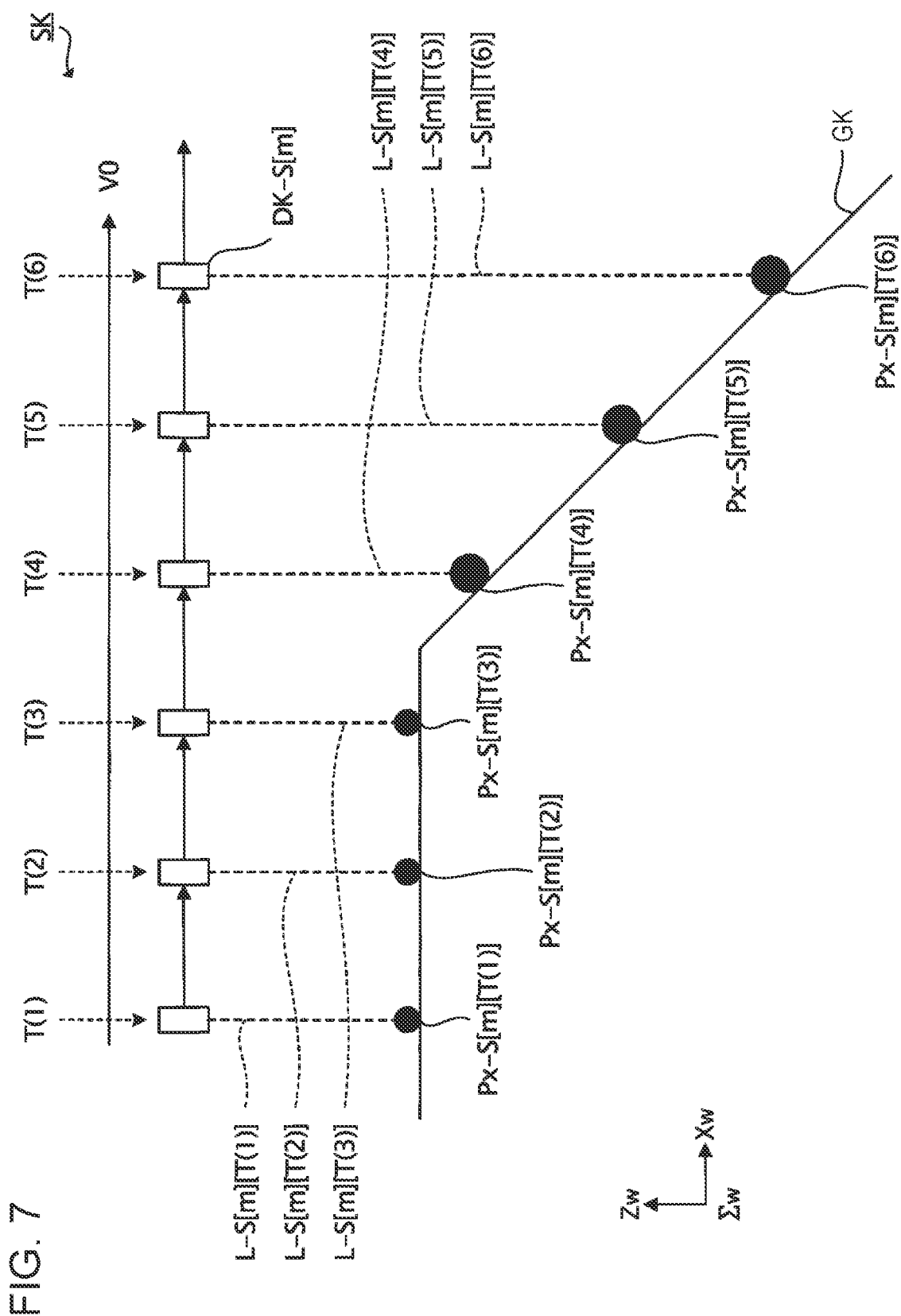
FIG. 7 is an illustrative diagram illustrating an example of virtual space information according to a second modification.

FIG. 7 is a diagram illustrating an example of the virtual discharge section DK-S[m] and the virtual image GK indicated by the virtual space information KK in the present modification. In the example illustrated in FIG. 7, assume that, from time T(1) to time T(6), the virtual discharge section DK-S[m] moves at a velocity V0 in the +Xw direction.

The distance at time T(n) along the virtual line L-S[m][T(n)] from the virtual discharge section DK-S[m] to the intersection point Px-S[m][T(n)] is referred to hereinafter as a distance E-S[m][T(n)]. In the example illustrated in FIG. 7, assume, for example, that the relationship represented by expression (1) holds among distances E-S[m][T(1)] to E-S[m][T(6)].

$$E-S[m][T(1)] = E-S[m][T(2)] = E-S[m][T(3)] < \\ E-S[m][T(4)] < E-S[m][T(5)] < E-S[m][T(6)] \quad (1)$$

Additionally, in the example illustrated in FIG. 7, assume that the values indicated by the intersection point color information CP-S[m][T(1)] to CP-S[m][T(6)] are equal to each other.

In the present modification, the display information generating section 22 sets the grayscale value WT-S[m][T(n)] indicated by the discharge color information CT-S[m][T(n)] to be larger when expression (2) holds for the distance E-S[m][T(n)] and a distance E-S[m][T(n−1)] than when expression (2) does not hold. In expression (2), a value α is a natural number greater than 0.

$$|E-S[m][T(n)]-E-S[m][T(n-1)]| < \alpha \times V0 \quad (2)$$

For example, in the example illustrated in FIG. 7, assume that the relationships of expressions (3) to (7) hold.

$$|E-S[m][T(2)]-E-S[m][T(1)]| \approx 0 < \alpha \times V0 \quad (3)$$

$$|E-S[m][T(3)]-E-s[m][T(2)]| \approx 0 < \alpha \times V0 \quad (4)$$

$$|E-S[m][T(4)]-E-S[m][T(3)]| < \alpha \times V0 \quad (5)$$

$$|E-S[m][T(5)]-E-S[m][T(4)]| < \alpha \times V0 \quad (6)$$

$$|E-S[m][T(6)]-E-S[m][T(5)]| < \alpha \times V0 \quad (7)$$

Therefore, in the example illustrated in FIG. 7, the display information generating section 22 sets the grayscale values WT-S[m][T(4)] to WT-S[m][T(6)]] to values greater than the grayscale values WT-S[m][T(2)] to WT-S[m][T(3)]. For example, in the example illustrated in FIG. 7, the display information generating section 22 sets the grayscale values WT-S[m][T(2)] to WT-S[m][T(3)] to grayscale value "2" corresponding to the case where the discharge section D-S[m] discharges ink the amount of which corresponds to a medium dot, and sets the grayscale values WT-S[m][T(4)] to WT-S[m][T(6)] to grayscale value "3" corresponding to the case where discharge section D-S[m] discharges ink the amount of which corresponds to large dot.

As described above, in the present modification, the grayscale value WT-S[m][T(n)] is determined in accordance with a change over time in the distance along the virtual line L-S[m][T(n)] from the virtual discharge section DK-S[m] to the intersection point Px-S[m][T(n)]. Therefore, in the present modification, even when the surface SF of the object Obj is inclined relative to the moving direction of the discharge section D-S[m], the grayscale value of the image G for the included surface may be prevented from decreasing.

In the present modification, the display information generating section 22 determines the grayscale value WT-S[m][T(n)] in accordance with a change over time in the distance along the virtual line L-S[m][T(n)] from the virtual discharge section DK-S[m] to the intersection point Px-S[m][T(n)]. However, the present disclosure is not limited to such. For example, the display information generating section 22 may determine the grayscale value WT-S[m][T(n)] in accordance with a change over time in the distance along the virtual line L-S[m][T(n)] from the head unit 7 to the intersection point Px-S[m][T(n)], or may determine the grayscale value WT-S[m][T(n)] in accordance with a change over time in the average value of the distances along the virtual lines L-S[m][T(n)] from (4×M) virtual discharge sections DK-S[m] to the intersection points Px-S[m][T(n)].

In this way, in the present modification, when the distance between the virtual image GK and the virtual discharge section DK-S[m] changes with a change in the relative positional relationship between the virtual image GK and the virtual discharge section DK-S[m] in the virtual space SK, the display information generating section 22 may generate the display information Img such that the amount of discharge of ink from the discharge section D-S[m] is larger than when the distance does not change.

Therefore, according to the present modification, even when the surface SF of the object Obj is inclined relative to the moving direction of the discharge section D-S[m], the grayscale value of the image G for the inclined surface may be prevented from decreasing.

Third Modification

In the embodiment and first and second modifications described above, the display information generating section 22 may determine the moving velocity of the virtual discharge section DK-S[m] in the virtual space SK in accordance with a change over time in the distance along the virtual line L-S[m][T(n)] from the virtual discharge section DK-S[m] to the intersection point Px-S[m][T(n)].

Figure 8:
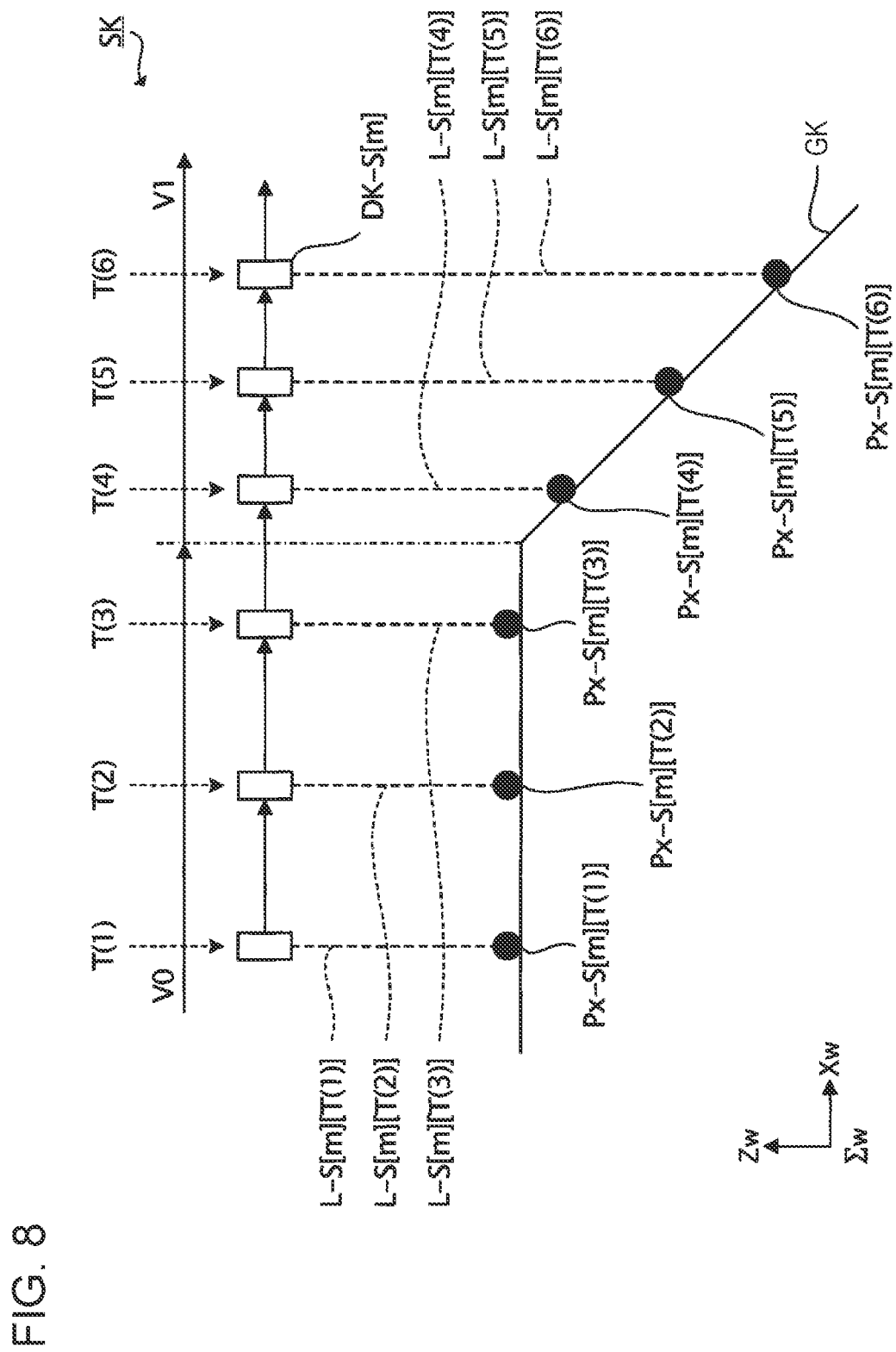
FIG. 8 is an illustrative diagram illustrating an example of virtual space information according to a third modification.

FIG. 8 is a diagram illustrating an example of the virtual discharge section DK-S[m] and the virtual image GK indicated by the virtual space information KK in the present modification. In the example illustrated in FIG. 8, assume that the virtual discharge section DK-S[m] moves in the +Xw direction from time T(1) to time T(6). Additionally, in the example illustrated in FIG. 8, like the example illustrated in FIG. 7 described above, for example, assume that the relationship represented by expression (1) described above holds among the distances E-S[m][T(1)] to E-S[m][T(6)]. Additionally, in the example illustrated in FIG. 8, assume that the values indicated by the intersection point color information CP-S[m][T(1)] to CP-S[m][T(6)] are equal to each other.

In the present modification, the display information generating section 22 sets the moving speed of the virtual discharge section DK-S[m] in the virtual space SK to be lower when expression (2) described above holds for the distance E-S[m][T(n)]] and the distance E-S[m][T(n−1)] than when expression (2) does not hold.

For example, in the example illustrated in FIG. 8, the virtual discharge section DK-S[m] in the virtual space SK is moved at the velocity V0 in the +Xw direction when expression (2) described above does not hold, and the virtual discharge section DK-S[m] in the virtual space SK is moved at a velocity V1, which is slower than the velocity V0, in the +Xw direction when expression (2) described above holds.

In the example illustrated in FIG. 8, assume that expressions (3) to (7) described above hold. Therefore, in the example illustrated in FIG. 8, the display information generating section 22 sets the moving velocity of the virtual discharge section DK-S[m] at times T(1) to T(3) to the velocity V0 and sets the moving velocity of the virtual discharge section DK-S[m] at times T(4) to T(6) to the velocity V1.

In the present modification, the display information generating section 22 outputs, at each time T(n), velocity specification information indicating the moving velocity of the virtual discharge section DK-S[m]. In the present modification, the hand controller 62 controls the robot hand 9 so that the head unit 7 moves at each time T(n) at a velocity in accordance with the velocity specification information.

As described above, in the present modification, the moving velocity of the virtual discharge section DK-S[m] is determined in accordance with a change over time in the distance along the virtual line L-S[m][T(n)] from the virtual discharge section DK-S[m] to the intersection point Px-S[m][T(n)]. Therefore, in the present modification, even when the surface SF of the object Obj is inclined relative to the moving direction of the discharge section D-S[m], the grayscale value of the image G for the inclined surface may be prevented from decreasing.

In the present modification, the display information generating section 22 determines the moving velocity of the virtual discharge section DK-S[m] in accordance with a change over time in the distance along the virtual line L-S[m][T(n)] from the virtual discharge section DK-S[m] to the intersection point Px-S[m][T(n)]. However, the present disclosure is not limited to such. For example, the display information generating section 22 may determine the moving velocity of the virtual discharge section DK-S[m] in accordance with a change over time in the distance along the virtual line L-S[m][T(n)] from the head unit 7 to the intersection point Px-S[m][T(n)], or may determine the moving velocity of the virtual discharge section DK-S[m] in accordance with a change over time in the average value of the distances along the virtual lines L-S[m][T(n)] from the (4×M) virtual discharge sections DK-S[m] to the intersection points Px-S[m][T(n)].

In this way, in the present modification, the display information generating section 22 may generate velocity specification information that specifies the moving velocity of the discharge section D-S[m] for the object Obj in accordance with a change in the distance between the virtual image GK and the virtual discharge section DK-S[m] with a change in the relative positional relationship between the virtual image GK and the virtual discharge section DK-S[m] in the virtual space SK.

Therefore, according to the present modification, even when the surface SF of the object Obj is inclined relative to the moving direction of the discharge section D-S[m], the grayscale value of the image G for the inclined surface may be prevented from decreasing.

Fourth Modification

The embodiment and first to third modifications described above illustrate that the duration from time T(n) to time T(n+1) is a certain period of time ΔT. However, the present disclosure is not limited to such. For example, the display information generating section 22 may determine an interval from time T(n−1) to time T(n) in accordance with a change over time in the distance along the virtual line L-S[m][T(n)] from the virtual discharge section DK-S[m] to the intersection point Px-S[m][T(n)].

Figure 9:
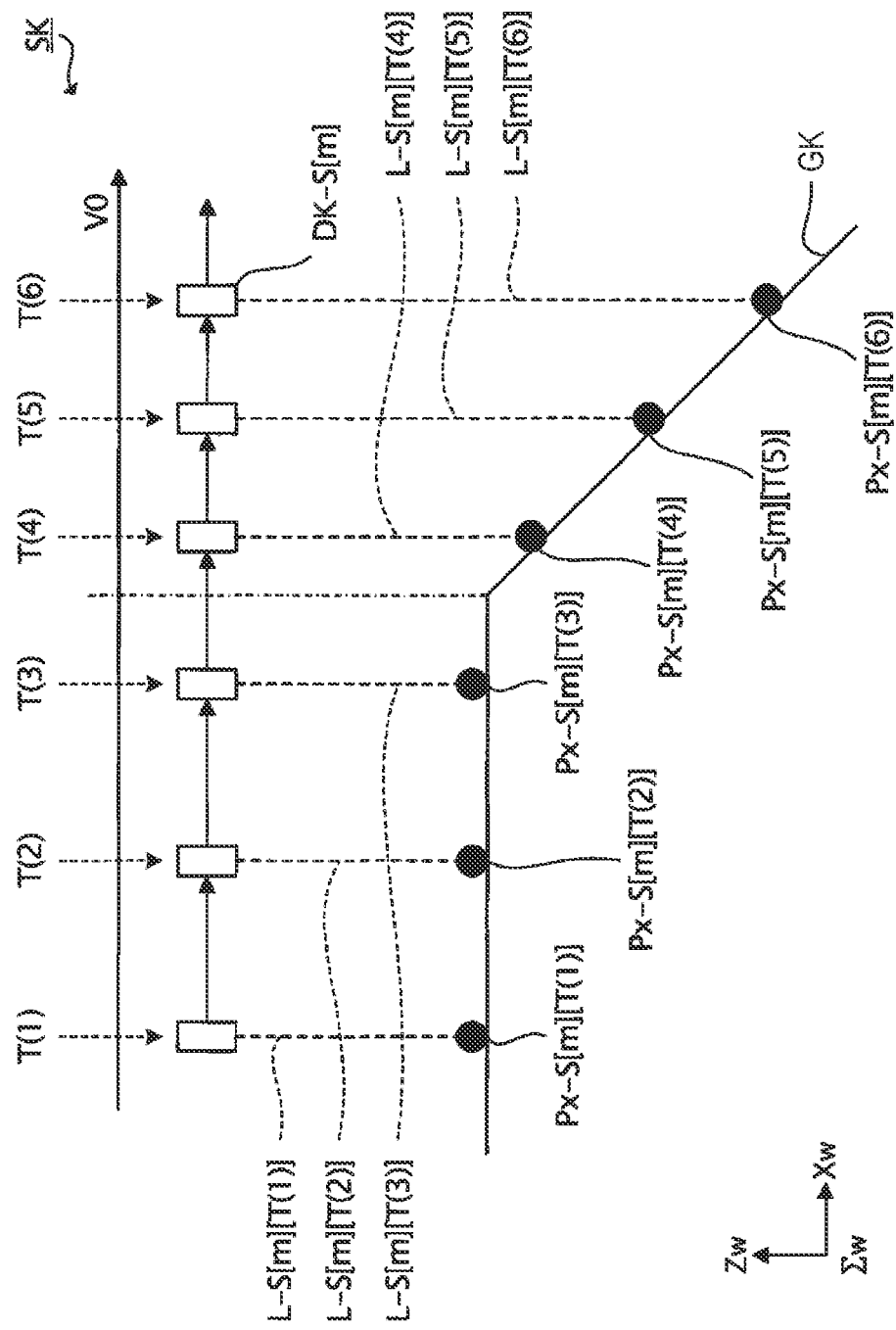
FIG. 9 is an illustrative diagram illustrating an example of virtual space information according to a fourth modification.

FIG. 9 is a diagram illustrating an example of the virtual discharge section DK-S[m] and the virtual image GK indicated by the virtual space information KK in the present modification. In the example illustrated in FIG. 9, assume that the virtual discharge section DK-S[m] moves in the +Xw direction at the velocity V0 from time T(1) to time T(6). In the example illustrated in FIG. 9, like the example illustrated in FIG. 7 described above, assume, for example, that the relationship represented by expression (1) described above holds among the distances E-S[m][T(1)] to E-S[m][T(6)]. In the example illustrated in FIG. 9, assume that the values indicated by the intersection point color information CP-S[m][T(1)] to CP-S[m][T(6)] are equal to each other.

In the present modification, the display information generating section 22 sets the duration from time T(n−1) to time T(n) to be shorter when expression (2) described above holds for the distance E-S[m][T(n)] and the distance E-S[m][T(n−1)] than when expression (2) does not hold.

In the example illustrated in FIG. 9, assume that expressions (3) to (7) described above hold. Therefore, in the example illustrated in FIG. 9, the display information generating section 22 sets the duration from time T(6) to time T(5), the duration from time T(5) to time T(4), and the duration from time T(4) to time T(3) to be shorter than the duration from time T(3) to time T(2) and the duration from time T(2) to time T(1).

In the present modification, the display information generating section 22 outputs interval specification information indicating the duration from time T(n−1) to time T(n). Then, in the present modification, the head controller 61 generates a latch signal LAT so that, at each time T(n), the interval at which the head unit 7 is driven is specified using the duration in accordance with the interval specification information.

As described above, in the present modification, the interval from time T(n−1) to time T(n) is determined in accordance with a change over time in the distance along the virtual line L-S[m][T(n)] from the virtual discharge section DK-S[m] to the intersection point PX-S[m][T(n)]. Therefore, in the present modification, even when the surface SF of the object Obj is inclined relative to the moving direction of the discharge section D-S[m], the grayscale value of the image G for the inclined surface may be prevented from decreasing.

In the present modification, the display information generating section 22 determines the interval from time T(n−1) to time T(n) in accordance with a change over time in the distance along the virtual line L-S[m][T(n)] from the virtual discharge section DK-S[m] to the intersection point Px-S[m][T(n)]. However, the present disclosure is not limited to such. For example, the display information generating section 22 may determine the interval from time T(n−1) to time T(n) in accordance with a change over time in the distance along the virtual line L-S[m][T(n)] from the head unit 7 to the intersection point Px-S[m][T(n)], or may determine the interval from time T(n−1) to time T(n) in accordance with a change over time in the average value of the distances along the virtual lines L-S[m][T(n)] from the (4×M) virtual discharge sections DK-S[m] to the intersection point PX-S[m][T(n)].

In this way, in the present modification, the display information generating section 22 may generate interval specification information that specifies the discharge interval of ink from the discharge section D-S[m] in accordance with a change in the distance between the virtual image GK and the virtual discharge section DK-S[m] with a change in the relative positional relationship between the virtual image GK and the virtual discharge section DK-S[m] in the virtual space SK.

Therefore, according to the present modification, even when the surface SF of the object Obj is inclined relative to the moving direction of the discharge section D-S[m], the grayscale value of the image G for the inclined surface may be prevented from decreasing.

Fifth Modification

The embodiment and first to fourth modifications described above illustrate that, in a period of time when the printing process is performed, the virtual head unit HK and the virtual discharge section DK-S[m] advances in a constant direction while maintaining a constant orientation in the virtual space SK, and the head unit 7 and the discharge section D-S[m] advances in a constant direction while maintaining a constant orientation in the real space SP. However, the present disclosure is not limited to such. The virtual head unit HK and the virtual discharge section DK-S[m] may change the advancing direction and orientation in the virtual space SK in the period of time when the printing process is performed. In this case, in the period of time when the printing process is performed, the head unit 7 and the discharge section D-S[m] may change the advancing direction and orientation of the head unit 7 and the discharge section D-S[m] in the real space SP in accordance with a change in the advancing direction and orientation of the virtual head unit HK and the virtual discharge section DK-S[m] in the virtual space SK. That is, the virtual head unit HK and the virtual discharge section DK-S[m] may change the advancing direction and orientation in a three-dimensional manner in the virtual space SK, and the head unit 7 and the discharge section D-S[m] may change the advancing direction and orientation in a three-dimensional manner in the real space SP.

For example, in the present modification, the virtual head unit HK and the virtual discharge section DK-S[m] may change the advancing direction and orientation so as to move along the virtual image GK in the virtual space SK. Specifically, the virtual head unit HK and the virtual discharge section DK-S[m] may advance in the virtual space SK so as to maintain the orientation with which the virtual line L-S[m] is perpendicular to the virtual image GK. The virtual head unit HK and the virtual discharge section DK-S[m] may also advance in the virtual space SK so as to maintain the positions with which the distance E-S[m][T(n)] is approximately constant.

FIG. 10 is a diagram illustrating an example of the virtual discharge section DK-S[m] and the virtual image GK indicated by the virtual space information KK in the present modification.

In the example illustrated in FIG. 10, assume that, when viewed in the +Yw direction, the virtual image GK includes the plane PL1 extending in the +Xw direction and the plane PL2 extending in a Bw direction. Here, the Bw direction is a direction perpendicular to the Yw-axis direction and is a direction intersecting the Xw-axis direction and the Zw-axis direction.

In the example illustrated in FIG. 10, also assume that, from time T(1) to time T(3), the virtual discharge section DK-S[m] moves at the velocity V0 in the +Xw direction along the plane PL1, and, from time T(4) to time T(6), the virtual discharge section DK-S[m] moves at the velocity V0 in the Bw direction along the plane PL2. In the example illustrated in FIG. 10, also assume that the distances E-S[m][T(1)] to E-S[m][T(6)] are approximately the same. In the example illustrated in FIG. 10, also assume that, from time T(1) to time T(6), the virtual discharge section DK-S[m] changes the orientation such that, when the virtual space SK is viewed in the +Yw direction, the virtual lines L-S[m][T(1)] to L-S[m][T(3)] are approximately parallel to the normal direction of the plane PL1 and the virtual lines L-S[m][T(4)] to L-S[m][T(6)] are approximately parallel to the normal direction of the plane PL2.

In the example illustrated in FIG. 10, the time interval between time T(3) and time T(4) may differ from each of the time interval between time T(1) and time T(2), the time interval between time T(2) and time T(3), the time interval between time T(4) and time T(5), and the time interval between time T(5) and time T(6). For example, when the shape of the boundary between the plane PL1 and the plane PL2 is convex as viewed from the virtual discharge section DK-S[m], the time interval between time T(3) and time T(4) may be longer than each of the time interval between time T(1) and time T(2), the time interval between time T(2) and time T(3), the time interval between time T(4) and time T(5), and the time interval between time T(5) and time T(6). Conversely, when the shape of the boundary between the plane PL1 and the plane PL2 is concave as viewed from the virtual discharge section DK-S[m], the time interval between time T(3) and time T(4) may be shorter than each of the time interval between time T(1) and time T(2), the time interval between time T(2) and time T(3), the time interval between time T(4) and time T(5), and the time interval between time T(5) and time T(6).

As described above, in the present modification, the virtual discharge section DK-S[m] advances on a path so as to be along the virtual image GK. In the present modification, the virtual discharge section DK-S[m] maintains its orientation with which the virtual line L-S[m] and the virtual image GK are approximately perpendicular to each other. Therefore, according to the present modification, it becomes easier for the discharge section D-S[m] to uniformly form dots on the surface SF of the object Obj.

Sixth Modification

In the embodiment and first to fifth modifications described above, the virtual space information KK may include virtual path information indicating the advancing path and changes over time of the virtual head unit HK and the virtual discharge section DK-S[m] in the virtual space SK. In this case, the display information generating section 22 may cause the virtual path information to be included in the display information Img. Then, in this case, the hand controller 62 may generate path information, which indicates the advancing path and changes over time of the head unit 7 and the discharge section D-S[m] in the real space SP, based on the virtual path information included in the display information Img, and generate the control signal Ctr-R based on the path information.

Seventh Modification

The embodiment and first to sixth modifications described above illustrate that the sizes of the virtual image GK and the virtual head unit HK in the virtual space SK indicated by the virtual space information KK are the same as the sizes of the image G and the head unit 7 in the real space SP. However, the present disclosure is not limited to such. The sizes of the virtual image GK and the virtual head unit HK in the virtual space SK indicated by the virtual space information KK may be different from the sizes of the image G and the head unit 7 in the real space SP.

For example, the virtual space information KK may be information in which the enlarged or reduced image G and head unit 7 obtained by enlarging or reducing the real space SP, which includes the image G and the head unit 7, with a certain position as the center of enlargement or reduction are represented as the virtual image GK and the virtual head unit HK in the virtual space SK. In this case, the relative positional relationship between the virtual image GK and the virtual head unit HK in the virtual space SK also corresponds to the relative positional relationship between the image G and the head unit 7 in the real space SP.

Eighth Modification

In the embodiment and first to seventh modifications described above, the terminal control unit 2 and the storage unit 3 may be mounted in the recording device 5.

Additionally, in the embodiment and first to fifth modifications described above, the terminal device 1 may include the recording control unit 6, the head unit 7, the ink supply unit 8, and the robot hand 9.

Ninth Modification

In the embodiment and first to eighth modifications described above, the robot hand 9 changes the position and orientation of the head unit 7 in the real space SP. However, the present disclosure is not limited to such. The robot hand 9 may be capable of changing the position and orientation of the object Obj in the real space SP. In this case, the position and orientation of the head unit 7 may be fixed in the real space SP.

What is claimed is:

1. An image processing apparatus for supplying display information indicating a three-dimensional image to a recording device including a discharge section that discharges liquid to an object having a three-dimensional shape to form a three-dimensional image on the object, the image processing apparatus comprising:
    an obtaining section that obtains virtual space information, the virtual space information indicating
        a virtual image in which the three-dimensional image is represented in a three-dimensional virtual space, and
        a virtual discharge section in which the discharge section is represented in the virtual space; and
    a generating section that generates the display information based on the virtual space information,
    wherein a relative positional relationship in the virtual space between the virtual image and the virtual discharge section indicated by the virtual space information corresponds to a relative positional relationship between the three-dimensional image and the discharge section.

2. The image processing apparatus according to claim 1, wherein the generating section
    generates intersection point information, based on the virtual space information, about an intersection point of the virtual image and a virtual line extending in a specific direction from the virtual discharge section in the virtual space, and
    generates the display information based on the intersection point information.

3. The image processing apparatus according to claim 1, wherein
    the recording device includes a plurality of discharge sections for discharging a plurality of kinds of liquid corresponding to a plurality of colors, and
    the generating section
        generates image color information based on the virtual space information, the image color information representing a color of the virtual image in the plurality of colors corresponding to the plurality of kinds of liquid, and
        generates the display information based on the image color information.

4. The image processing apparatus according to claim 2, wherein the generating section
    generates quantization information by quantizing a grayscale value of the virtual image at the intersection point indicated by the intersection point information, and
    generates the display information based on the quantization information.

5. The image processing apparatus according to claim 1, wherein the recording device includes
    a head unit provided with the discharge section, and
    a moving mechanism that changes a relative positional relationship between the head unit and the object.

6. The image processing apparatus according to claim 5, wherein when a distance between the virtual image and the virtual discharge section changes with a change in the relative positional relationship in the virtual space between the virtual image and the virtual discharge section, the generating section generates the display information such that an amount of discharge of liquid from the discharge section is larger than when the distance between the virtual image and the virtual discharge section does not change with a change in the relative positional relationship in the virtual space between the virtual image and the virtual discharge section.

7. The image processing apparatus according to claim 5, wherein the generating section generates interval specification information that specifies a discharge interval of liquid from the discharge section in accordance with a change in the distance between the virtual image and the virtual discharge section with a change in the relative positional relationship between the virtual image and the virtual discharge section in the virtual space.

8. The image processing apparatus according to claim 5, wherein the generating section generates velocity specification information that specifies a moving velocity of the discharge section for the object in accordance with a change in a distance between the virtual image and the virtual discharge section with a change in the relative positional relationship between the virtual image and the virtual discharge section in the virtual space.

9. A method for controlling an image processing apparatus for supplying display information indicating a three-dimensional image to a recording device including a discharge section that discharges liquid to an object having a three-dimensional shape to form a three-dimensional image on the object, the method comprising:
    an obtaining step of obtaining virtual space information, the virtual space information indicating
        a virtual image in which the three-dimensional image is represented in a three-dimensional virtual space, and
        a virtual discharge section in which the discharge section is represented in the virtual space; and
    a generating step of generating the display information based on the virtual space information,
    wherein a relative positional relationship in the virtual space between the virtual image and the virtual discharge section indicated by the virtual space information corresponds to a relative positional relationship between the three-dimensional image and the discharge section.

10. A non-transitory computer-readable storage medium storing a program of an image processing apparatus for supplying display information indicating a three-dimensional image to a recording device including a discharge section that discharges liquid to an object having a three-dimensional shape to form a three-dimensional image on the object, the program causing a computer to function as:
    an obtaining section that obtains virtual space information, the virtual space information indicating
        a virtual image in which the three-dimensional image is represented in a three-dimensional virtual space, and
        a virtual discharge section in which the discharge section is represented in the virtual space; and
    a generating section that generates the display information based on the virtual space information,
    wherein a relative positional relationship in the virtual space between the virtual image and the virtual discharge section indicated by the virtual space information corresponds to a relative positional relationship between the three-dimensional image and the discharge section.

* * * * *